United States Patent Office 3,035,073
Patented May 15, 1962

3,035,073
N-ALKYL-N(ALKYL-MERCURI)ALIPHATYL
SULFONAMIDES
Richard S. Waritz, Wilmington, Del., assignor to E. I. du Pont de Nemours and Company, Wilmington, Del., a corporation of Delaware
No Drawing. Filed Mar. 23, 1960, Ser. No. 16,955
6 Claims. (Cl. 260—431)

This invention relates to certain N-alkyl-N(alkylmercuri)aliphatyl sulfonamides as new compounds and to their use as microbiocides for plants, seeds, and soil.

More particularly, this invention is directed to compounds of the formula (1) 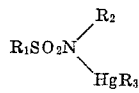

where $R_1$ is a monovalent acyclic unsubstituted hydrocarbyl radical containing from 1–4 carbon atoms,
$R_2$ is $R_1$ or a hydroxy substituted monovalent hydrocarbyl radical containing from 1–4 carbon atoms, and
$R_3$ is methyl or ethyl, with the proviso that $R_1$, $R_2$ and $R_3$ taken together shall not contain more than 8 carbon atoms.

The monovalent hydrocarbyl radicals in the $R_1$ and $R_2$ positions can, for example, be such radicals as methyl, ethyl, n-propyl, isopropyl, n-butyl, isobutyl, sec. butyl, tert. butyl, allyl, or propargyl.

Preferred for use according to this invention are those compounds in which $R_2$ is a radical chosen from among those described for $R_1$. The superior compounds are those in which $R_1$ and $R_2$ are methyl radicals, and $R_3$ is methyl or ethyl.

The compounds of this invention can be prepared according to the following equation:

(2) 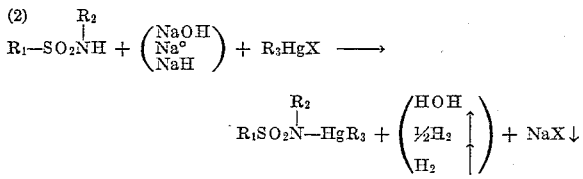

In this equation, $R_1$, $R_2$, and $R_3$ have the same meaning as in Formula 1, and X is an anion such as chloride or bromide.

The N-substituted alkyl sulfonamides are easily prepared from the corresponding sulfonyl chloride and amine, as described by Baxter et al. in J. Chem. Soc., p. 670 (1955). The alkyl mercuri halides can be prepared according to the procedure of Slotta and Jacobi set forth in J. Prakt. Chem., 120, 272 (1929).

Reaction 2 is preferably run in an inert solvent such as benzene, toluene, or xylene. Sodium hydride, or metallic sodium are preferred for the preparation of the sodium sulfonamide in these solvents. The reaction can also be run in a low molecular weight liquid alcohol, such as methanol, using metallic sodium or sodium hydride to prepare the sodium sulfonamide. The reaction can also be run in water, with sodium hydroxide as the reagent.

Preferably, the inorganic sodium component is added to the solvent first, and the sulfonamide is then added with stirring. This sequence of addition furnishes a check on the dryness of the solvents, as hydrogen is evolved if the solvents are wet. However, the reaction will proceed satisfactorily if these components are added to the solvent in the reverse order.

After the sulfonamide salt has been formed, usually ½ hour, the hydrocarbyl mercuri component is added and stirring is continued until reaction is complete, generally ½ to 1½ hours.

The reaction is most economically run if an equimolar ratio of all reactants is used. However, an excess of the inorganic and the organo-mercuri components does not interfere with the reaction.

The time required for the formation of the sulfonamide salt depends upon the reactivity of the sulfonamide and the inorganic sodium component in the solvent used at the particular temperature chosen. Generally, it can be said that the reaction takes about ½ hour to complete. Similarly, the reaction time of the sulfonamide salt with the organomercurial is dependent on temperature and solvent. Generally, however, it is complete within ½ hour.

In general, temperatures above 45° C. are preferred because they accelerate the reactions, but temperatures from 4° C. to the boiling point of the solvent can be used.

If an inert solvent or an alcohol is used as a reaction medium, the desired product will usually be soluble in the solvent, and the by-products and unreacted starting materials will not. Thus, by simply filtering off the insoluble material and removing the solvent from the filtrate in vacuo, the desired product is obtained in an essentially pure form. The product can then be purified further by recrystallization from a suitable solvent, such as diethylether, dibutylether, chlorothene, or cyclohexane.

If water is used as the reaction medium, all reaction products will be soluble. Isolation of the desired product can then be achieved by extraction with a water-immiscible solvent such as toluene or by concentration and cooling of the reaction solution until the product precipitates. The product thus obtained can then be recrystallized.

Since the desired products have less solubility in water than the sodium halide formed, the amount of water used as a solvent can be adjusted initially so that the mixture resulting from the reaction is supersaturated with respect to the organomercurial product and unsaturated with respect to the inorganic salt product. Filtration will then leave the desired product behind as a precipitate. This can be dried and recrystallized if desired.

For some purposes, it is unnecessary to isolate the organomercurial product from the aqueous reaction mixture. For example, the necessary formulating adjuvants can be added directly to the reaction mixture and the resulting composition can be used directly, or, if desired, all water can be removed and the resulting residue can be formulated into a soluble powder.

Illustrative of the compounds within the scope of this invention are

N-methyl-N-methylmercurimethane sulfonamide
N-methyl-N-methylmercuriethane sulfonamide N-methyl-N-methylmercuripropane sulfonamide
N-methyl-N-methylmercuriisopropane sulfonamide
N-methyl-N-methylmercuributane sulfonamide
N-methyl-N-methylmercuriisobutane sulfonamide
N-methyl-N-methylmercurisec.-butane sulfonamide
N-methyl-N-methylmercuritert.-butane sulfonamide
N-methyl-N-ethylmercurymethane sulfonamide
N-methyl-N-ethylmercuripropane sulfonamide
N-methyl-N-ethylmercuriethane sulfonamide
N-ethyl-N-ethylmercuripropane sulfonamide
N-2-hydroxyethyl-N-methylmercuripropane sulfonamide
N-2-hydroxypropyl-N-methylmercuripropane sulfonamide
N-2-hydroxybutyl-N-methylmercuripropane sulfonamide
N-(1-hydroxymethylpropyl)-N-methylmercuripropane sulfonamide
N-propyl-N-methylmercuripropane sulfonamide
N-isopropyl-N-methylmercuripropane sulfonamide
N-ethyl-N-ethylmercuriethane sulfonamide
N-ethyl-N-ethylmercuripropane sulfonamide
N-ethyl-N-ethylmercuriisopropane sulfonamide
N-ethyl-N-ethylmercuributane sulfonamide
N-ethyl-N-ethylmercuriisobutane sulfonamide
N-ethyl-N-ethylmercurisec.-butane sulfonamide
N-ethyl-N-ethylmercuritert.-butane sulfonamide
N-(2-hydroxyethyl)-N-ethylmercuriethane sulfonamide
N-propyl-N-ethylmercuriethane sulfonamide
N-isopropyl-N-ethylmercuriethane sulfonamide
N-(2-hydroxypropyl)-N-ethylmercuriethane sulfonamide
N-butyl-N-ethylmercuriethane sulfonamide
N-isobutyl-N-ethylmercuriethane sulfonamide
N-tert.-butyl-N-ethylmercuriethane sulfonamide
N-(1-hydroxymethylpropyl)-N-ethylmercuriethane sulfonamide
N-(1-methyl-2-hydroxypropyl)-N-ethylmercuriethane sulfonamide
N-allyl-N-ethylmercurimethane sulfonamide
N-propargyl-N-methylmercurimethane sulfonamide
N-ethyl-N-ethylmercurimethane sulfonamide The compounds of this invention possess outstanding fungicidal activity. They can be used to control such turf diseases as dollar spot (*Sclerotinia homoeocarpa*), brown patch (*Pellicularia filamentosa*), snow mold (*Fusarium nivale*), copper spot (*Gleocercospora sorghi*), and blight caused by Helminthosporium spp. The compounds of this invention are particularly useful for the control of fungi on golf-course turf. They are also useful as soil fungicides against such organisms as *Rhizoctonia solani*, Pythium spp., and Fusarium spp. The compounds can be used as seed disinfectants or seed protectants for the seeds of wheat, oats, cotton, barley, flax, sorghum, rice, and the like. When applied to seeds, the compounds of this invention protect them, while germinating, from attack by soil-borne pathogens such as those belonging to the classes Pythium and Rhizoctonia. The compounds also disinfect seeds already infected with such seed-borne fungus diseases as stinking smut of wheat (*Pilletia caries*), loose smut of oats (*Ustilago avenae*), Helminthosporium victoriae on oats, and anthracnose of cotton (*Glomerella gossypii*).

The compounds of this invention show a high degree of fungicidal activity coupled with very low mercurial phytotoxicity. In addition, solutions of the compounds are unexpectedly noncorrosive to brass, which is advantageous since equipment currently being used to apply such compounds for agricultural purposes usually contains a number of brass parts.

The compounds of this invention are volatile, which makes them more effective as seed fungicides. Fungi carried on the seed, under seed hulls, and in breaks in the seed coat are reached by the vapors of the compounds and destroyed. After application to seed, a compound of this invention will redistribute itself over the entire seed surface, thus making the treatment more uniform.

All the compounds of this invention are soluble in solvents which are not toxic to plants or animals. This is also an advantage, since more uniform coverage of a substrate can be achieved with a solution than with other types of compositions, and more convenient methods of application can be used.

The compounds of this invention can also be used to control slime forming organisms in wood pulping processes. They are also useful in preserving proteinaceous, fatty, and carbohydrate materials against fungus attack. Such materials as starch, animal and vegetable glues, oil-based paints, and lumber can be protected from fungus attack by applying a composition of this invention.

The compounds of this invention can be formulated into a variety of compositions. They can, for example, be made up as solutions containing from 1 to 25% of active ingredient, or mixtures of active ingredients. The solutions can be made up using such solvents as dimethylformamide, dimethylacetamide, N-methylpyrrolidone, cyclohexanone, ethylene glycol, ethyl Cellosolve, ethyl alcohol, isopropyl alcohol, or water. Mixtures of these solvents are often preferred for reasons of cost, and because a suitable balance of physical properties such as low freezing point, high flash point, and extendability by water can be obtained.

Solutions which are dilutable with water are preferred because water is the most economical and readily available carrier. The compounds of this invention are especially suited for such formulations because they are quite soluble in water, even without the use of co-solvents.

The compounds of this invention can also be formulated as solutions in oils. Such compositions have the advantages of adhering to the surfaces being treated and resisting removal by water and abrasion. Furthermore, such oil-base compositions tend to penetrate surfaces treated and therefore destroy fungi more effectively. The particular oil used in any given formulation must be one which has no deleterious effect on the substance being treated. For example, when seeds are being treated, an oil must be used which is not phytotoxic to seeds. For this purpose, one can use isoparaffinic hydrocarbons, deodorized kerosene, mineral oils such as diesel engine oil, vegetable oils such as linseed oil or soybean oil, or animal oils such as whale oil.

Diluents, extenders, or co-solvents for the oil compositions can also be used. These can be chosen from among the common organic solvents. For example, hydrocarbon solvents such as benzene, xylene, or methylated naphthalenes can be used. Ketones such as diacetone alcohol, cyclohexanone, mesityl oxide, or isophorone can also be used. Also useful are such esters as ethyl acetate; branched chain alcohols such as isopropanol or 3-hexanol; ether-alcohols such as 2($\beta$-butoxyethoxy) ethanol; ethers such as phenolic ethers or diisoamyl ether; and cyclic nitrogen compounds such as N-methyl-2-pyrrolidone or pyridine. These diluents, extenders, and co-solvents can often be used alone rather than in conjunction with the oils.

Aqueous emulsions, the so-called emulsifiable oil concentrates, can be made by adding a dispersing or emulsifying agent to the oil solutions. Such dispersing and emulsifying agents are listed in detail in Bulletin E–607 of the Bureau of Entomology and Plant Quarantine of the U.S. Department of Agriculture and in articles by McCutcheon in "Soap and Sanitary Chemicals," December 1957 and January, February, March, April 1958.

Suitable emulsifying agents are such polyoxyethylene derivatives as polyoxyethylene ethers of alkylated phenols, polyoxyethylene esters of mixed rosin and fatty acids, and polyoxyethylene ethers of sorbitan fatty acid esters. Mixtures of these nonionic emulsifiers with anionic emulsifiers such as sulfonated oils are also very suitable emulsifier systems.

The dispersing or emulsifying agent is preferably one which is soluble in the oil solution. Ordinarily, the agent will not comprise more than 10% by weight of the emulsifiable oil composition. With some materials the percentage will be 5% or less.

The emulsifiable oil concentrates are especially suited for dilution or extension with water. When so diluted, the concentrates form an emulsion which is then applied to seeds, plants, or soil. When small amounts of water are used, the emulsion can be of the water-in-oil type. When the dilution is greater, the emulsions are usually of the oil-in-water type. Such emulsions are especially suited for application to seed with slurry or misting type application equipment.

Preferred emulsifiable oil concentrates contain from 8% to 40% of the active ingredient. Concentrates containing 10-30% are especially preferred.

Dust or powder compositions containing the compounds of this invention can also be prepared. These compositions contain the active material adsorbed on finely divided inert carriers or dusts such as natural clays, talc, diatomaceous earth, walnut shell flour, redwood flour, synthetic fine silica, calcium silicate, and other solid inert carriers customarily used in preparing compositions in dust form. Such dusts can be converted to water-wettable powders by the usual expedient of including a surface-active agent of the wetting or dispersing type. These materials cause the compositions to disperse easily in water to give aqueous sprays.

The surface-active agents employed can be of the anionic, cationic, or nonionic type. They include, for example, sodium oleate, sulfonated petroleum oils, alkyl aryl sulfonates, sodium lauryl sulfate, polyethylene oxide derivatives, lignin sulfonates, and other surface-active agents. A detailed list of such agents is set forth in articles by McCutcheon in "Soap and Chemical Specialties," December 1957 and January, February, March, and April 1958.

Those compounds of this invention which are more than about 10% soluble in water can be prepared as water-soluble powders. In addition to the active ingredient, these powders can contain such water-soluble diluents as sodium or potassium carbonate, sodium or potassium sulfate, sodium chloride, soluble phosphates, soluble borates, and soluble nitrates. These powders can also contain corrosion inhibitors such as sodium nitrite, wetting agents such as alkyl aryl sulfonates, and gums such as methyl cellulose.

The compositions of this invention can also contain a dye. This dye is especially useful in compositions to be used in the treatment of seeds, since it provides a means for marking clearly those seeds which have been treated. Xanthene dyes such as Rhodamine B or Rhodamine B extra, cationic azo dyes such as Sevron Red, or oil-soluble dyes such as Spirit Soluble Red can be used.

The compositions of this invention can contain almost any percentage of the active compound. Since the exact amount to be used will depend on such factors as the particular condition being treated, the substance being treated, and climate factors, it is not possible to indicate the exact amount to be used. Generally, however, the compositions of this invention will contain not more than 95% or less than .05% by weight of active compounds.

This invention will be better understood by referring to the following illustrative examples.

EXAMPLE 1

*Preparation of N-Methyl-N-Ethylmercurimethane Sulfonamide*

Thirty parts by weight of 53% active sodium hydride emulsion in mineral oil are mixed with eight hundred parts of dry toluene. This mixture is heated to 75° C., and 65.4 parts by weight of N-methylmethane sulfonamide are added dropwise. When hydrogen evolution has ceased, the reaction mixture is cooled, and 158.4 parts by weight of ethylmercuri chloride are added. The entire mixture is then reheated to 75° C. for ½ hour. It is then cooled to room temperature and the salt which formed is filtered off. Removal of the solvent from the filtrate in vacuo leaves 183 parts by weight of a viscous, yellowish oil. Recrystallization of this oil from dry boiling diethyl ether yields pure N-methyl-N-ethylmercurimethane sulfonamide in the form of short white needles which melt at 54-55° C. Partial concentration of the supernatant fluid yields additional N-methyl-N-methylmercurimethane sulfonamide as needles melting at 51-53.5° C.

The procedure of this example can also be used to prepare the following compounds, by substituting a listed sulfonamide for the methylmethane sulfonamide used above.

| Ex. No. | Name of sulfonamide | Parts by weight | Name of product |
| --- | --- | --- | --- |
| 2 | N-methylethane- | 73.8 | N-methyl-N-ethylmercuriethane sulfonamide. |
| 3 | N-methylpropane- | 82.2 | N-methyl-N-ethylmercuripropane sulfonamide. |
| 4 | N-methylisopropane- | 82.2 | N-methyl-N-ethylmercuriisopropane sulfonamide. |
| 5 | N-methylbutane- | 90.6 | N-methyl-N-ethylmercuributane sulfonamide. |
| 6 | N-methylisobutane- | 90.6 | N-methyl-N-ethylmercuriisobutane sulfonamide. |
| 7 | N-methyl-sec.-butane-. | 90.6 | N-methyl-N-ethylmercurisec.-butane sulfonamide. |
| 8 | N-methyl-tert.-butane-. | 90.6 | N-methyl-N-ethylmercuritert.-butane sulfonamide. |
| 9 | N-ethylmethane- | 73.8 | N-ethyl-N-ethylmercurimethane sulfonamide. |
| 10 | N-ethylethane- | 82.2 | N-ethyl-N-ethylmercuriethane sulfonamide. |
| 11 | N-ethylpropane- | 90.6 | N-ethyl-N-ethylmercuripropane sulfonamide. |
| 12 | N-ethylisopropane- | 90.6 | N-ethyl-N-ethylmercuriisopropane sulfonamide. |
| 13 | N-ethyl-tert.-butane- | 99.0 | N-ethyl-N-ethylmercuritert.-butane sulfonamide. |
| 14 | N-propylmethane- | 82.2 | N-propyl-N-ethylmercurimethane sulfonamide. |
| 15 | N-propylethane- | 90.6 | N-propyl-N-ethylmercuriethane sulfonamide. |
| 16 | N-propyl-isopropane- | 99.0 | N-propyl-N-ethylmercuriisopropane sulfonamide. |
| 17 | N-butylmethane- | 90.6 | N-butyl-N-ethylmercurimethane sulfonamide. |
| 18 | N-tert.-butylethane-. | 99.0 | N-tert.-butyl-N-ethylmercuriethane sulfonamide. |

EXAMPLE 19

*Preparation of N-Methyl-N-Methylmercurimethane Sulfonamide*

Twenty parts by weight of 53% active sodium hydride mineral oil emulsion are mixed with four hundred parts of dry toluene. This mixture is heated to 75° C. and 43.6 parts by weight of N-methylmethane sulfonamide are gradually added. When hydrogen is no longer evolved, the mixture is cooled and 118 parts by weight of methylmercuribromide are added. The mixture is then heated to 110° C. for ½ hour. The resulting salt is filtered off while the mixture is hot. The filtrate is then cooled in an ice bath to yield 78 parts by weight of essentially pure N-methyl-N-methylmercurimethane sulfonamide in the form of short translucent parallelpipeds melting at 102-104° C.

The procedure of this example can also be used to prepare the following compounds, by substituting a listed sulfonamide for the N-methylmethane sulfonamide used above.

| Ex. No. | Name of sulfonamide | Parts by weight | Name of product |
|---|---|---|---|
| 20 | N-methylethane- | 49.2 | -methyl-N-methyl-mercuriethane sulfonamide. |
| 21 | N-methylpropane- | 54.8 | N-methyl-N-methyl-mercuripropane sulfonamide. |
| 22 | N-methylisopropane- | 54.8 | N-methyl-N-methyl-mercuriisopropane sulfonamide. |
| 23 | N-methylbutane- | 60.4 | N-methyl-N-methyl-mercuributane sulfonamide. |
| 24 | N-methylisobutane- | 60.4 | N-methyl-N-methyl-mercuriisobutane sulfonamide. |
| 25 | N-methyl-sec.-butane- | 60.4 | N-methyl-N-methyl-mercurisec.-butane sulfonamide. |
| 26 | N-methyl-tert.-butane- | 60.4 | N-methyl-N-methyl-mercuritert.-butane sulfonamide. |
| 27 | N-ethylmethane- | 49.2 | N-ethyl-N-methylmercurimethane sulfonamide. |
| 28 | N-ethylethane- | 54.8 | N-ethyl-N-methylmercuriethane sulfonamide. |
| 29 | N-ethylpropane- | 60.4 | N-ethyl-N-methylmercuripropane sulfonamide. |
| 30 | N-ethyl-isopropane- | 60.4 | N-ethyl-N-methylmercuriisopropane sulfonamide. |
| 31 | N-ethyl-tert.-butane- | 66.0 | N-ethyl-N-methylmercuritert.-butane sulfonamide. |
| 32 | N-propylmethane- | 54.8 | N-propyl-N-methyl mercurimethane sulfonamide. |
| 33 | N-propylethane- | 60.4 | N-propyl-N-methyl mercuriethane sulfonamide. |
| 34 | N-propyl-isopropane- | 66.0 | N-propyl-N-methyl mercuriisopropane sulfonamide. |
| 34 | N-propyl-tert.-butyl- | 71.6 | N-propyl-N-methyl mercuritert.-butyl sulfonamide. |
| 36 | N-butylmethane- | 60.4 | N-butyl-N-methyl-mercurimethane sulfonamide. |
| 37 | N-tert.-butylethane- | 66.0 | N-tert.-butyl-N-methylmercuriethane sulfonamide. |
| 38 | N-tert.-butyl-isopropane- | 71.6 | N-tert.-butyl-N-methylmercuriisopropane sulfonamide. |

EXAMPLE 39

*Preparation of N-(2-Hydroxyethyl)-N-Methylmercurimethane Sulfonamide*

Sixteen parts by weight of sodium hydroxide are dissolved in four hundred parts of dry methanol. To this solution are added, with stirring, 55.6 parts by weight of N-(2-hydroxyethyl)-methane sulfonamide. The stirring is continued for ½ hour, and then 118 parts by weight of methylmercuribromide are added. This mixture is heated to reflux for 1 hour, cooled, and the sodium bromide is then filtered off. The solvent is stripped from the filtrate in vacuo. The residue is dissolved in acetone, filtered, and the solvent again removed in vacuo, to yield the desired product in essentially pure form.

Using this procedure, the following compounds can be made by substituting the sulfonamide indicated, in the amounts stated, for the N-(2-hydroxyethyl)-methane sulfonamide used above.

| Ex. No. | Name of sulfonamide | Parts by weight | Name of product |
|---|---|---|---|
| 40 | N-propargyl methane- | 53.2 | N-propargyl-N-methylmercurimethane sulfonamide. |
| 41 | N-(2-hydroxyethyl)-ethane-. | 61.2 | N-(2-hydroxyethyl)-N-methylmercuriethane sulfonamide. |
| 42 | N-(2-hydroxyethyl)-propane-. | 66.8 | N-(2-hydroxyethyl)-N-methylmercuripropane sulfonamide. |
| 43 | N-(2-hydroxyethyl)-isopropane-. | 66.8 | N-(2-hydroxyethyl)-N-methylmercuriisopropane sulfonamide. |
| 44 | N-(2-hydroxyethyl)-butane-. | 72.4 | N-(2-hydroxyethyl)-N-methylmercuributane sulfonamide. |
| 45 | N-(2-hydroxyethyl)-tert.-butane-. | 72.4 | N-(2-hydroxyethyl)-N-methylmercuritert.-butane sulfonamide. |
| 46 | N-(2-hydroxypropyl)-methane-. | 61.2 | N-(2-hydroxypropyl)-N-methylmercurimethane sulfonamide. |
| 47 | N-(2-hydroxypropyl)-ethane-. | 66.8 | N-(2-hydroxypropyl)-N-methylmercuriethane sulfonamide. |
| 48 | N-(2-hydroxypropyl)-propane-. | 72.4 | N-(2-hydroxypropyl)-N-methylmercuripropane sulfonamide. |
| 49 | N-(2-hydroxypropyl)-isopropane-. | 72.4 | N-(2-hydroxypropyl)-N-methylmercuripropane sulfonamide. |
| 50 | N-(2-hydroxypropyl)-butane-. | 78.0 | N-(2-hydroxypropyl)-N-methylmercuributane sulfonamide. |
| 51 | N-(2-hydroxypropyl)-tert.-butane-. | 78.0 | N-(2-hydroxypropyl)-N-methylmercuritert.-butane sulfonamide. |
| 52 | N-(1-hydroxymethylpropyl)methane-. | 66.8 | N-(1-hydroxymethylpropyl)-N-methylmercurimethane sulfonamide. |
| 53 | N-(1-hydroxymethylpropyl)ethane-. | 72.4 | N-(1-hydroxymethylpropyl)-N-methylmercuriethane sulfonamide. |
| 54 | N-(1-hydroxymethylpropyl)propane-. | 78.0 | N-(1-hydroxymethylpropyl)-N-methylmercuripropane sulfonamide. |
| 55 | N-(1-hydroxymethylpropyl)isopropane-. | 78.0 | N-(1-hydroxymethylpropyl)N-methylmercuriisopropane sulfonamide. |
| 56 | N-(2-hydroxybutyl)-methane-. | 66.8 | N-(2-hydroxybutyl)-N-methylmercurimethane sulfonamide. |
| 57 | N-(2-hydroxybutyl)-ethane-. | 72.4 | N-(2-hydroxybutyl)-N-methylmercuriethane sulfonamide. |
| 58 | N-(2-hydroxybutyl)-propane-. | 78.0 | N-(2-hydroxybutyl)-N-methylmercuripropane sulfonamide. |
| 59 | N-(2-hydroxybutyl)-isopropane-. | 78.0 | N-(2-hydroxybutyl)-N-methylmercuriisopropane sulfonamide. |
| 60 | N-(1-methyl-2-hydroxypropyl)-methane-. | 66.8 | N-(1-methyl-2-hydroxypropyl)-N-methylmercurimethane sulfonamide. |
| 61 | N-(1-methyl-2-hydroxypropyl)-ethane-. | 72.4 | N-(1-methyl-2-hydroxypropyl)-N-methylmercuriethane sulfonamide. |
| 62 | N-(1-methyl-2-hydroxypropyl)-propane-. | 78.0 | N-(1-methyl-2-hydroxypropyl)-N-methylmercuripropane sulfonamide. |
| 63 | N-(1-methyl-2-hydroxypropyl)-isopropane-. | 78.0 | N-(1-methyl-2-hydroxypropyl)-N-methylmercuriisopropane sulfonamide. |

EXAMPLES 64–79

Using the procedure of Example 39, the following N-ethylmercuri sulfonamides can also be made, by substituting the sulfonamides indicated, in the amounts stated, for the N-(2-hydroxyethyl)-methane sulfonamide and the methylmercuribromide in Example 39.

| Ex. No. | Name of sulfonamide | Parts by weight | Name of product |
|---|---|---|---|
| 64 | N-allylmethane- | 54.0 | N-allyl-N-ethylmercurimethane sulfonamide. |
| 65 | N-(2-hydroxyethyl) ethane-. | 61.2 | N-(2-hydroxyethyl)-N-ethylmercuriethane sulfonamide. |
| 66 | N-(2-hydroxyethyl) propane-. | 66.8 | N-(2-hydroxyethyl)-N-ethylmercuripropane sulfonamide. |

| Ex. No. | Name of sulfonamide | Parts by weight | Name of product |
| --- | --- | --- | --- |
| 67 | N-(2-hydroxyethyl) isopropane-. | 66.8 | N-(2-hydroxyethyl)-N-ethylmercuriisopropane sulfonamide. |
| 68 | N-(2-hydroxyethyl) butane-. | 72.4 | N-(2-hydroxyethyl)-N-ethylmercuributane sulfonamide. |
| 69 | N-(2-hydroxyethyl) tert.-butane-. | 72.4 | N-(2-hydroxyethyl)-N-ethylmercuritert.-butane sulfonamide. |
| 70 | N-(2-hydroxypropyl) methane-. | 61.2 | N-(2-hydroxypropyl)-N-ethylmercurimethane sulfonamide. |
| 71 | N-(2-hydroxypropyl) ethane-. | 66.8 | N-(2-hydroxypropyl)-N-ethylmercuriethane sulfonamide. |
| 72 | N-(2-hydroxypropyl) propane-. | 72.4 | N-(2-hydroxypropyl)-N-ethylmercuripropane sulfonamide. |
| 73 | N-(2-hydroxypropyl) isopropane-. | 72.4 | N-(2-hydroxypropyl)-N-ethylmercuriisopropane sulfonamide. |
| 74 | N-(1-hydroxymethyl-propyl)methane-. | 66.8 | N-(1-hydroxymethyl-propyl)-N-ethylmercurimethane sulfonamide. |
| 75 | N-(1-hydroxymethyl-propyl)ethane-. | 72.4 | N-(1-hydroxymethyl-propyl)-N-ethylmercuriethane sulfonamide. |
| 76 | N-(2-hydroxybutyl)-methane-. | 66.8 | N-(2-hydroxybutyl)-N-ethylmercurimethane sulfonamide. |
| 77 | N-(2-hydroxybutyl)-ethane-. | 72.4 | N-(2-hydroxybutyl)-N-ethylmercuriethane sulfonamide. |
| 78 | N-(1-methyl-2-hydroxypropyl)methane- | 66.8 | N-(1-methyl-2-hydroxypropyl)-N-ethylmercurimethane sulfonamide. |
| 79 | N-(1-methyl-2-hydroxypropyl)ethane-. | 72.4 | N-(1-methyl-2-hydroxypropyl)-N-ethylmercuriethane sulfonamide. |

EXAMPLE 80

*Water Extendable Liquid*

| | Percent |
| --- | --- |
| Ethylmercuri-N-methyl-methane sulfonamide | 7.6 |
| Ethanol (denatured) | 5.0 |
| Rhodamine dye | 2.0 |
| Ethylene glycol | 65.4 |
| Dimethylformamide | 20.0 |

The ethylmercuri-N-methyl-methane sulfonamide is dissolved in a mixture of ethyl alcohol, ethylene glycol, and water. When solution is complete, the dye is added. This composition is then applied to acid-delinted cotton seed at 2.0 fluid ounces per hundredweight. The seed is planted in loamy soil infected with a variety of soil-borne pathogens. It will be observed that the number of emerging seedlings is more than three times as great as that obtained with untreated cotton seed used as a control.

EXAMPLE 81

*Water Extendable Liquid*

| | |
| --- | --- |
| Methylmercuri-N - methylmethane sulfonamide | 4 grams. |
| N-methyl-2-pyrrolidone | To make 100 ml. of solution. |

The solution is prepared by dissolving the compound in the solvent. This solution is then applied to Selkirk wheat seeds and to machine-delinted cotton seed by tumbling the seed and solution together until uniform coverage is obtained. The seeds are planted and the wheat seed is held at 50° F. for 6 days to allow soil-borne pathogens to act. The cotton seed is not chilled. The seeds are then allowed to germinate. The number of treated seeds which germinate is significantly greater than the number of control seeds which germinate. There is no evidence of injury due to treatment.

EXAMPLE 82

*Water Extendable Liquid*

| | Percent |
| --- | --- |
| Ethylmercuri-N-methyl-methane sulfonamide | 3.91 |
| Ethanol (denatured) | 5.00 |
| Water | 20.00 |
| Ethylene glycol | 70.09 |
| Rhodamine dye | 1.00 |

The ethylmercuri-N-methyl-methane sulfonamide is dissolved in a mixture of denatured alcohol, water, and ethylene glycol. When solution is complete, the dye is added.

This formulation is applied to Triumph wheat seed in a wide range of concentrations. The seed is then planted and the emerging seedlings are observed and counted 6 days after planting. In spite of the wide range of dosages, no injury or deformation in the seedlings such as are often typical of overtreatment with mercury compounds is noted.

This solution does not corrode brass, is stable at low temperatures, and is dilutable with water.

EXAMPLE 83

*Water Extendable Liquid*

| | Percent |
| --- | --- |
| Ethylmercuri-N-methyl-methane sulfonamide | 3.91 |
| Dimethylformamide | 95.09 |
| Rhodamine dye | 1.00 |

The solution is prepared by mixing the ingredients until the solids are dissolved. This solution is stable, even at low temperatures. The solution does not corrode brass. It can be diluted with water and used as a seed treatment for fuzzy cotton (a dilution of 1:2 or 1:4 with water is desirable), for flax (dilute 1:2 or 1:3), for rice (dilute 1:4 to 1:8), for rye (dilute 1:8), for sorghum (dilute 1:5 or 1:6, approximately), for wheat (dilute 1:16), and for oats (dilute 1:5, approximately).

EXAMPLE 84

*Water Extendable Liquid*

| | Percent |
| --- | --- |
| Methylmercuri-N-methyl-methane sulfonamide | 3.74 |
| Dimethylformamide | 26.00 |
| Ethylene glycol | 50.00 |
| Water | 19.26 |
| Rhodamine dye | 1.00 |

This formulation is made up as in Example 83. It is similarly suitable for treatment of a wide variety of seeds, either as is or diluted with water. The physical properties of this solution are also similar to those of the solution in Example 83.

EXAMPLE 85

*Water Extendable Liquid*

| | Percent |
| --- | --- |
| Methylmercuri-N-methylmethane sulfonamide | 3.77 |
| Ethylene glycol | 55.00 |
| Water | 41.23 |

The methylmercuri-N-methylmethane sulfonamide is dissolved in a mixture of water and ethylene glycol.

This composition, sprayed to run-off onto apple leaves (*Pyrus malus*) using a solution containing 0.008% of active ingredient in water, gives 100% control of apple scab (*Venturia inaequalis*).

EXAMPLE 86

*Solution*

A solution is prepared by diluting 4.52 grams of ethylmercuri-N-methylmethane sulfonamide with enough N-methyl pyrrolidone to make 100 ml. of solution. This solution is applied to seeds, as follows:

(a) Trail barley: The seed is treated by tumbling it in the solution until uniform coverage is obtained. The seed is then planted and held at 50° F. for several days. The treated seeds show significantly better germination counts than the untreated control seeds.

(b) Vickland oats infected with Helminthosporium: The seeds are treated as above and stored in a closed container for 4 days. The seeds are then planted in sand. The number of healthy seedlings which emerge is significantly greater than the number which emerge from untreated seeds.

EXAMPLE 87

Wettable Powder

| | Percent |
|---|---|
| Ethylmercuri-N-ethylpropane sulfonamide | 60.0 |
| Sodium alkyl naphthalene sulfonate | 2.0 |
| Sodium lignin sulfonate | 1.5 |
| Fine silica | 36.5 |

All ingredients are blended together, micropulverized, and then reblended. When this formulation is applied to the pear tree (*Pyrus communis*) as a foliage spray at a concentration of .02% of the formulation in water, good control of scab (*Venturia pyrina*) is obtained.

EXAMPLE 88

Water Soluble Powder

| | Percent |
|---|---|
| Methylmercuri-N-2-hydroxyethylpropane sulfonamide | 25.0 |
| Polyethylene oxide esters of tall oil acids concreted with urea | 5.0 |
| Methyl cellulose | 1.0 |
| Sodium sulfate | 61.0 |
| Sodium nitrite | 2.0 |
| Rhodamine B extra | 6.0 |

All the ingredients are blended together, micropulverized, and reblended. This composition is dissolved in water and is used to treat wheat seed at 0.11 ounce per hundredweight to protect the wheat against soil-borne and seed-borne pathogens.

EXAMPLE 89

Emulsifiable Oil Concentrate

| | Percent |
|---|---|
| Ethylmercuri-N-isobutylethane sulfonamide | 15.0 |
| Alkyl aryl polyether alcohols | 7.0 |
| Spirit Soluble Red | 3.0 |
| Xylene | 75.0 |

The ethylmercuri-N-isobutylethane sulfonamide is dissolved in the xylene. When solution is complete, the alkyl aryl polyether alcohols are added and dissolved. For use, the formulation is diluted with water to obtain an emulsion containing 0.125 pound of active ingredient per 100 gallons. When this emulsion is applied to sycamore (*Platanus accidentalis*) as a foliage spray, good control of anthracnose (*Gnomonia veneta*) is obtained.

EXAMPLE 90

Water Extendable Solution

| | Percent |
|---|---|
| Methylmercuri-N-2-hydroxyethylmethane sulfonamide | 8 |
| Rhodamine B | 2 |
| Dimethylformamide | 50 |
| Water | 40 |

The methylmercuri-N-hydroxyethylmethane sulfonamide and the Rhodamine B dye are dissolved in the dimethylformamide, and the water is then added.

Seeds can be treated with this composition by diluting the concentrate with 8 parts of water and applying the solution in a seed treater so that the treating rate is 1.5 ounces of the concentrate per hundredweight of seed.

EXAMPLE 91

Wettable Powder

| | Percent |
|---|---|
| Methylmercuri-N-n-propylisopropane sulfonamide | 40 |
| Sodium salts of polymerized alkyl naphthalene sulfonic acids | 1 |
| Sodium alkyl naphthalene sulfonate | 2 |
| Sevron Red | 5 |
| Synthetic fine silica | 52 |

All the ingredients are blended together, micropulverized, and reblended. When this powder is slurried in water and applied to rice seed at 0.2 ounce per bushel, a good stand of rice free of fungus infection is obtained.

EXAMPLE 92

Emulsifiable Oil

| | Percent |
|---|---|
| Ethylmercuri-N-allylethane sulfonamide | 25 |
| Poly alkyl aryl carboxylic acid esters plus oil-soluble sulfonates | 5 |
| Cyclohexanone | 70 |

The ethylmercuri-N-allylethane sulfonamide is dissolved in the cyclohexanone. The poly alkyl aryl carboxylic acid esters plus oil-soluble sulfonates are then added.

EXAMPLE 93

Control of Turf Diseases

Twelve ounces of the water extendable liquid formulation of Example 85 is diluted with water to a total volume of 5 gallons. This is then sprayed at weekly intervals during the growing season on 1,000 square feet of turf containing Kentucky bluegrass, creeping red fescue, and Astoria colonial bent grass. Complete control is obtained of such diseases as brown patch (*Pellicularia filamentosa*), dollar spot (*Sclerotinia homoeocarpa*) copper spot (*Gleocercospora sorghi*) and Helminthosporium blight (*Helminthosporium vogans*).

EXAMPLE 94

Control of Soil-Borne Fungi

One-half pint of the water extendable liquid composition described in Example 85 is diluted with water to a total volume of 10 gallons. This diluted preparation is then sprayed on a band 4 inches wide over one acre of open furrows containing cotton seed (approximately 12,000 linear feet of row). The spray is directed in such a way as to strike the sides of the furrow as well as the seed in the bottom of the furrow. The furrow is then closed, thus completing the planting operation.

The above treatment gives essentially 100% control of cotton seedling damage by such organisms as *Rhizoctonia solani*), Fusarium spp., Pythium spp., and Sclerotinia spp. which abound in cotton soils.

EXAMPLE 95

Control of Slime

Approximately one ounce of the wettable powder formulation of Example 87, when added to one ton of dry fiber equivalent, at or before the point in a wood pulping process where slime forms, will effectively control slime-producing organisms.

These organisms can also be controlled by metering into the process, at or before the point where slime forms, the water extendable liquid formulation of Example 85. Addition is regulated so as to give a final concentration of from 5 to 10 ounces of concentrate per ton of dry fiber equivalent.

EXAMPLE 96

*Preservation of Paper Coating and Wood Pulp*

Paper coating stock and wood pulp can be preserved by the addition of from 1 to 2 ounces of the wettable powder formulation of Example 87 per ton of coating stock or dry fiber.

EXAMPLE 97

*Preservation of Carbohydrate, Protein, and Lipid Containing Materials*

Starches can be preserved by blending from .01% to .1% of the wettable powder formulation of Example 87 into the product.

A similar concentration of the same formulation, blended into vegetable and animal glues and other solid proteinaceous materials, will stop the attack of these materials by fungi.

Oil-based paints and substrates to which they are applied can be protected from fungus attack by blending from .04% to 4% of the emulsifiable oil formulation of Example 90 into the final paint or the pigment vehicle. Protection can also be obtained by the addition to the pigment of from 0.01% to 1.0% of a compound listed in Examples 1 through 38.

EXAMPLE 98

*Control of Sap Stain Microorganisms in or on Wood*

A dipping solution suitable for the disinfection or protection of freshly sawed lumber can be prepared by diluting from ½ to 1 gallon of the water extendable liquid formulation of Example 85 to one hundred gallons with water. If oak wood is to be treated, two to four pounds of a caustic such as soda ash can also be added.

The solution thus prepared will give excellent control of such organisms as the blue staining *Cerotostomela* spp., *Diplodia natalensis*, *Endoconidiophora coerulescens*, and *Graphium*, spp.

The invention claimed is:
1. Compounds of the formula

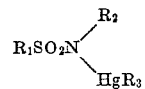

where
   $R_1$ is selected from the group consisting of monovalent acyclic unsubstituted hydrocarbyl radicals containing from 1 to 4 carbon atoms,
   $R_2$ is selected from the group consisting of monovalent acyclic unsubstituted hydrocarbyl radicals containing from 1 to 4 carbon atoms, and hydroxy substituted monovalent hydrocarbyl radicals containing from 1 to 4 carbon atoms, and
   $R_3$ is selected from the group consisting of methyl and ethyl,
with the proviso that $R_1$, $R_2$, and $R_3$ taken together shall not contain more than a total of 8 carbon atoms.
2. N-methyl-N-(methylmercuri)methane sulfonamide.
3. N-methyl-N-(ethylmercuri)methane sulfonamide.
4. N-methyl-N-(methylmercuri)butane sulfonamide.
5. N-ethyl-N-(ethylmercuri)ethane sulfonamide.
6. N-methyl-N-(methylmercuri)ethane sulfonamide.

References Cited in the file of this patent

UNITED STATES PATENTS

| | | |
|---|---|---|
| 2,133,787 | Hathaway | Oct. 18, 1938 |
| 2,492,314 | Olin | Dec. 27, 1949 |
| 2,571,095 | Altschul | Oct. 16, 1951 |
| 2,665,234 | Goodhue | Jan. 5, 1954 |
| 2,834,795 | Wendt | May 13, 1958 |
| 2,840,502 | Lambrech | June 24, 1958 |
| 2,885,418 | Traverso et al. | May 5, 1959 |